United States Patent [19]

Bernard et al.

[11] Patent Number: 4,799,386
[45] Date of Patent: Jan. 24, 1989

[54] ELECTROSTATIC ACCELEROMETER WITH DUAL ELECTRICAL CONNECTION TO ITS TEST MASS

[75] Inventors: Alain Bernard, Fresnes; Pierre Touboul, Guyancourt, both of France

[73] Assignee: Office National d'Etudes et de Recherches Aerospatiales, Chatillon, France

[21] Appl. No.: 10,441

[22] Filed: Dec. 30, 1986

[30] Foreign Application Priority Data

Dec. 31, 1985 [FR] France ................................. 8519469

[51] Int. Cl.[4] ........................ G01P 15/125; G01P 3/44
[52] U.S. Cl. .................................................. 73/517 B
[58] Field of Search ............. 73/517 B, 517 R, 516 R

[56] References Cited

U.S. PATENT DOCUMENTS

3,229,530  1/1966  Wilcox et al. ..................... 73/517 B
4,059,797 11/1977  Gay ........................................ 374/60
4,393,710  7/1983  Bernard ................................ 73/517
4,566,328  1/1986  Bernard et al. ................... 73/517 B
4,583,404  4/1986  Bernard et al. ................... 73/517 B Primary Examiner—Stewart J. Levy
Assistant Examiner—Robert P. Bell
Attorney, Agent, or Firm—Lowe, Price, LeBlanc, Becker & Shur

[57] ABSTRACT

An accelerometer having a test weight movable in relation to a frame includes three pairs of mutually electrically orthogonal conducting parallel faces (1–6). Electrodes connected to the frame form capacitors with faces of the test weight. The six faces form two sets of three faces (1–3) and (4–6). The faces of a set form a first conductor insulated from the faces of the second set which form a second conductor. Position sensing voltages are applied to first and second conductors through very flexible leads (7 and 8). Position control voltages derived from the position sensing voltages are applied to the electrodes.

4 Claims, 8 Drawing Sheets

FIG. 10

ELECTROSTATIC ACCELEROMETER WITH DUAL ELECTRICAL CONNECTION TO ITS TEST MASS

FIELD OF THE INVENTION

This invention concerns those accelerometers in which an acceleration measurement is deduced from electrostatic forces required to hold a test weight still or bring it back to a position defined with respect to a body for the accelerometer.

DESCRIPTION OF THE PRIOR ART

FR-B-2511509 filed Dec. 31, 1980 discloses an electrostatic accelerometer having a test weight with a cruciform structure. The accelerometer is formed of three planar rectangular plates having planes which are two by two orthogonal.

EP-A-0118359 filed Feb. 28, 1984 discloses an electrostatic test weight comprising planar surface elements, two by two opposite and parallel forming three pairs of surface elements. The directions normal to these elements correspond to sensitive axes of the accelerometer. In this document the form recommended for the test weight is a cube.

Figure 1:
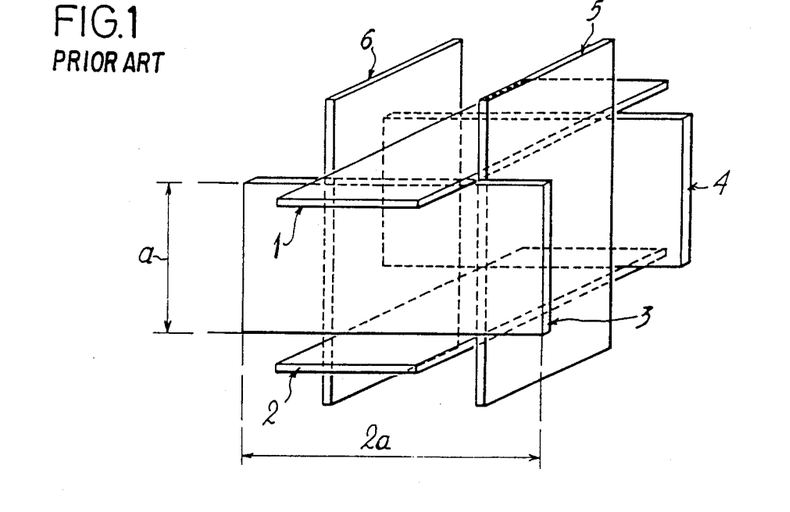
FIG. 1 is a perspective of one possible test weight shape.

EP-A-0127500 filed Apr. 20, 1984 discloses another electrostatic accelerometer including a test weight and electrode suspension system. In the recommended arrangement a rigid test weight has a large surface to weight ratio and planar electrodes are formed by metal sputtering in a vacuum on an insulating substrate. According to FIG. 1 the test weight is formed by six thin plates, each having a length equal to two times the width a. The six plates form a cube having an edge a. Each plate projects beyond the limits of the cube on both sides thereof by a distance equal to a/2.

In all of these prior art arrangements a feedback electrostatic suspension arrangement having six degrees of freedom for the test weight is implemented without any conductor connection to the test weight (configuration disclosed in the document EP-A-9118359) or with an electric link to the test (configuration disclosed in the document FR-B-2511509).

SUMMARY OF THE INVENTION

Generally the present invention concerns an electrostatic accelerometer with a test weight having portions defining movable electrodes and an accelerometer body having portions defining stationary electrodes. The movable and stationary electrodes are included in capacitors serving both as position sensors and position controllers. The movable electrodes are divided into two mutually insulated sets that are fed with signals via two flexible leads.

It is a primary object of the invention to simplify the electronic portion of the accelerometer by reducing the number of control amplifiers used to apply the control voltages to the position control electrodes.

In lieu of the requirement for one amplifier per electrode, as in the prior art, opposite electrodes are connected together and thus supplied with a signal from a single amplifier. This halves the number of amplifiers, resulting in a substantial reduction of power consumption by the accelerometer. It also improves accelerometer reliability and eliminates many drawbacks associated with different characteristics among the amplifiers.

Another object of the invention is to improve the stability of the test weight controlled position relative to the electrodes by reducing the sensitivity of the position detection electrodes or sensors to changes in the stray capacitances of the leads to the electrodes. This improvement contributes to better overall accelerometer performance, especially to greater bias stability.

Still another object of the invention is to enable greater miniaturization of the capacitive position sensors by eliminating the need for differential transformers used in the previous arrangements described in the three aforementioned patents.

BRIEF DESCRIPTION OF THE DRAWINGS

The invention will now be described in greater detail, with reference to the appended drawings in which:

FIGS. 1 through 4 are illustrations of the prior art, while the FIGS., 5 through 10, are illustrations of a preferred configuration for the accelerometer according to the present invention, wherein two leads to the test weight are used.

DESCRIPTION OF THE PREFERRED EMBODIMENTS

Figure 2:
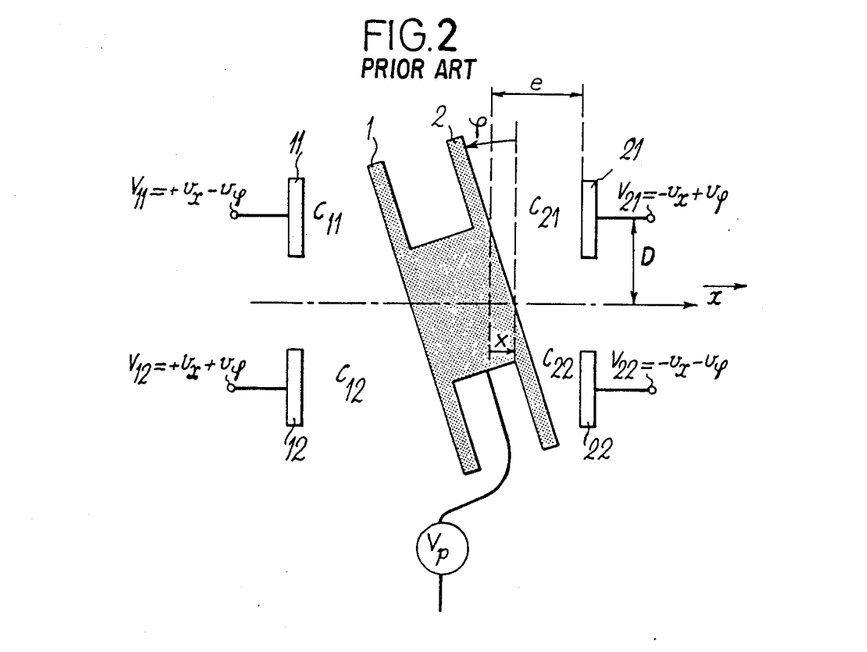
FIG. 2 is a schematic cross sectional view of the accelerometer to indicate the translational $V_x$ and rotational $V_y$ control voltages, and the bias voltage $V_p$ when, in accordance with Patent FR-B-2511509, a single electrical lead to the test weight is utilized.

Referring first to FIG. 2, x and y are position parameters respectively representing the translation and rotation of the weight in relation to its neutral or nominal controlled position, i.e. that position in which the weight is centered with respect to the electrodes and its faces are respectively parallel to said electrodes. The voltages applied to the four electrodes of surface area S and to the weight impart to the latter, when x and y are zero:

a force along axis x of $$F = \left[ \frac{4\epsilon S}{e^2} V_p \right] V_x$$

and a torque having a moment normal to the plane of the figure $$T = \left[ \frac{4D\epsilon S}{e^2} V_p \right] V_\gamma$$

where 2D is the distance between the centers of two electrodes relative to the coordinate axis.

This force and torque are directly proportional to the translation and rotational control voltages $V_x$ and $V_\gamma$. This configuration accordingly makes it possible to achieve linear position control of the weight in relation to the electrodes.

Figure 3:
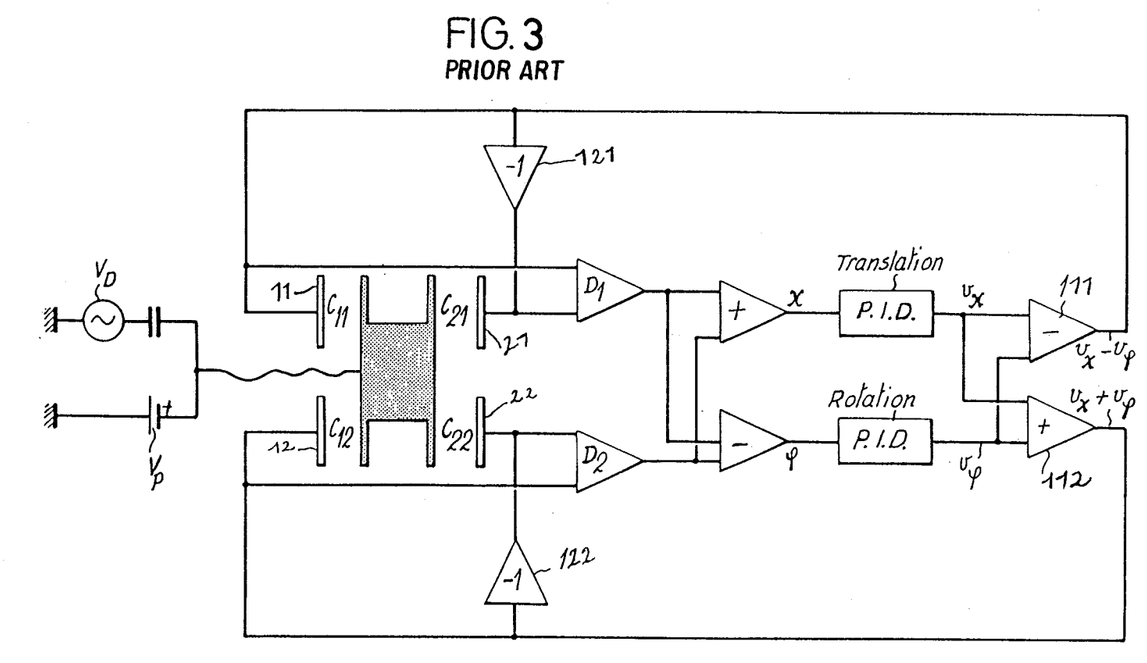
FIG. 3 is a block diagram of a control loop corresponding to the configuration of FIG. 2.

As shown in FIG. 3 such control is realized with two capacitive sensors or detectors $D_1$ and $D_2$, used to measure the translation x and the rotation $\gamma$ of the weight; the four electrodes are identical and the sensitivities of the detectors are the same. The sum of the outputs of the detectors thus solely reflects translation distance x, whereas the difference between the detector outputs reflects rotation angle $\gamma$.

Based on the position data so obtained, two servo loops of the "proportional plus integral plus derivative" (PID) type determine the appropriate control voltages $V_x$ and $V_\gamma$ to keep the weight centered and stable in relation to the electrodes. The control voltage combinations $\pm V_x$, $\pm V_\gamma$ are applied to the four electrodes 11, 12, 21, 22 via four high-voltage amplifiers 111, 112, 121, 122. These amplifiers are shown in FIG. 3 as differential amplifier 111, summing amplifier 112 and inverters 121 and 122.

Figure 4:
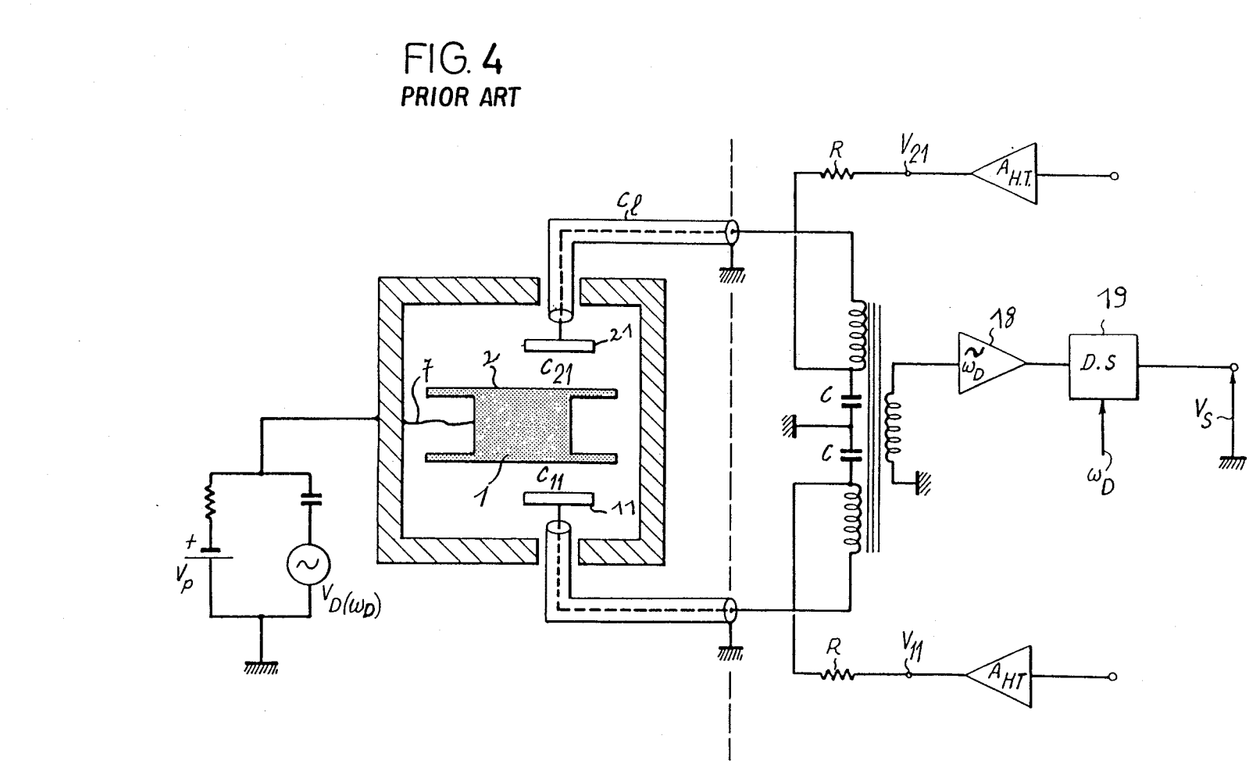
FIG. 4 is a diagram of the operating principle of a differential-transformer-based capacitive detector intended for the accelerometer configuration shown in FIGS. 2 and 3.

In FIG. 4 is shown how the DC control voltages are applied to the same electrodes used to detect position through the coils of a differential transformer. Capacitances $C_{21}$ and $C_{11}$, the difference whereof must be measured by the capacitive detectors, are connected in a bridge circuit driven by sinewave voltage VD, having an angular frequency $\omega_D$, that is also applied to weight 1 via lead 7.

The detector output signal $V_s$ is obtained in response to bridge unbalance signal being fed through amplifier 18 and synchronous demodulator 19.

Figure 5:
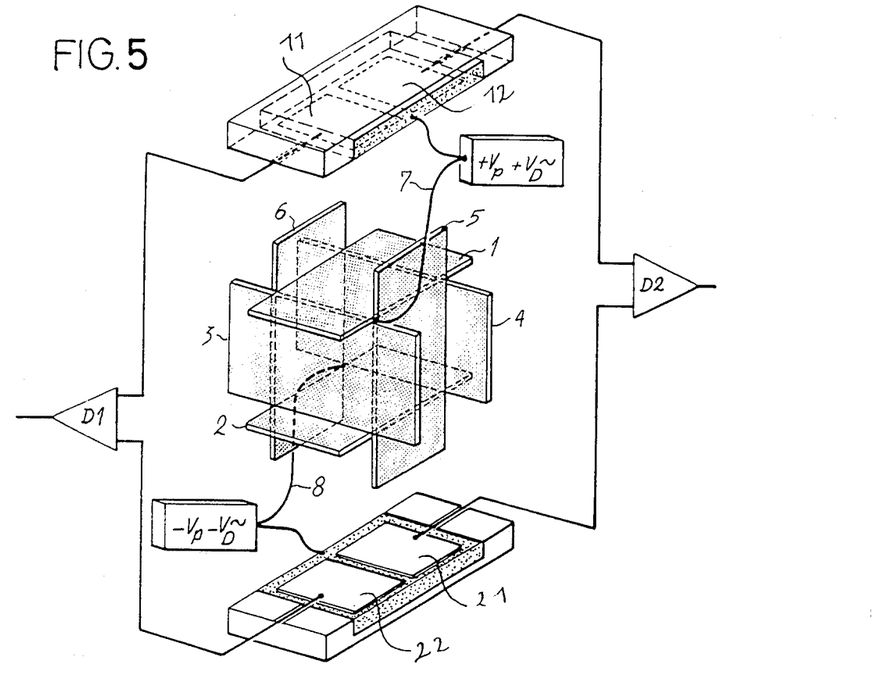
FIG. 5 is a schematic drawing of an accelerometer according to the invention having a test weight including six plates.

Referring now to FIG. 5, the six silica plates 1-6 making up the test weight are metallized to provide two sets of mutually electrically insulated plates 1-3 and 4-6 (three plates are included in each set). Electrical continuity subsists through the three plates of each set. Each three-plate set is respectively driven to a pair of potentials $(+V_p+V_d)$ and $(-V_p-V_d)$ that are symmetrical with respect to the frame potential. To this end sources $(+V_p+V_d)$ and $(-V_p-V_d)$ are respectively connected to the two sets by two very flexible lead wires 7 and 8. Along each of the three axes of the accelerometer, the two pairs of electrodes are connected to the inputs of two capacitive detectors $D_1$ and $D_2$.

Figure 6:
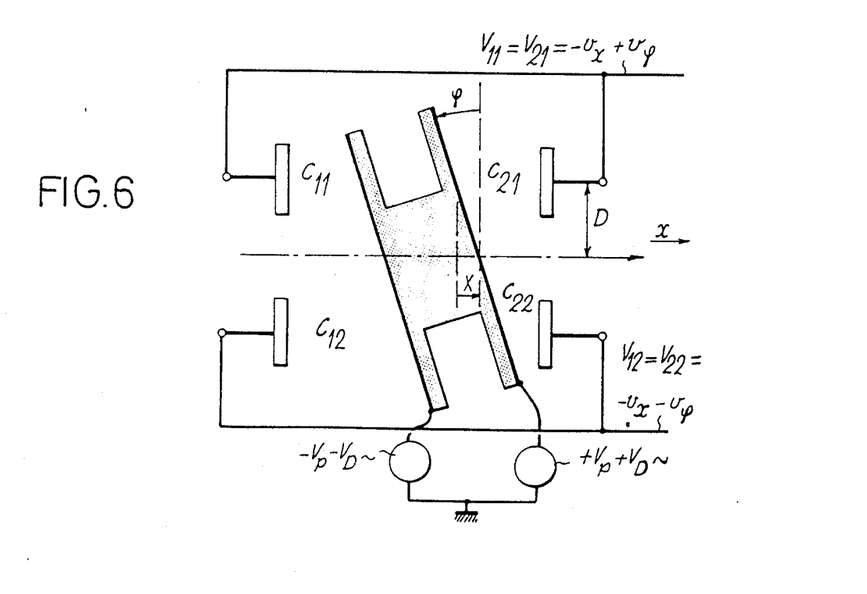
FIG. 6 is a schematic cross sectional view of the preferred configuration of the accelerometer for the translation control $V_x$ and rotation control $V_y$ voltages, wherein bias ($\pm V_p$) and detection ($\pm VD$) voltages are applied to opposite faces of the weight by two flexible leads.

Compared with the prior art just reviewed herein, and referring to FIG. 6, the DC voltage differences (due to the control and biasing voltages) are identical to those obtained in FIG. 2. The new configuration of FIG. 6 thus provides the same electrostatic force and torque, both of which are linear functions of the position control voltages.

Figure 7:
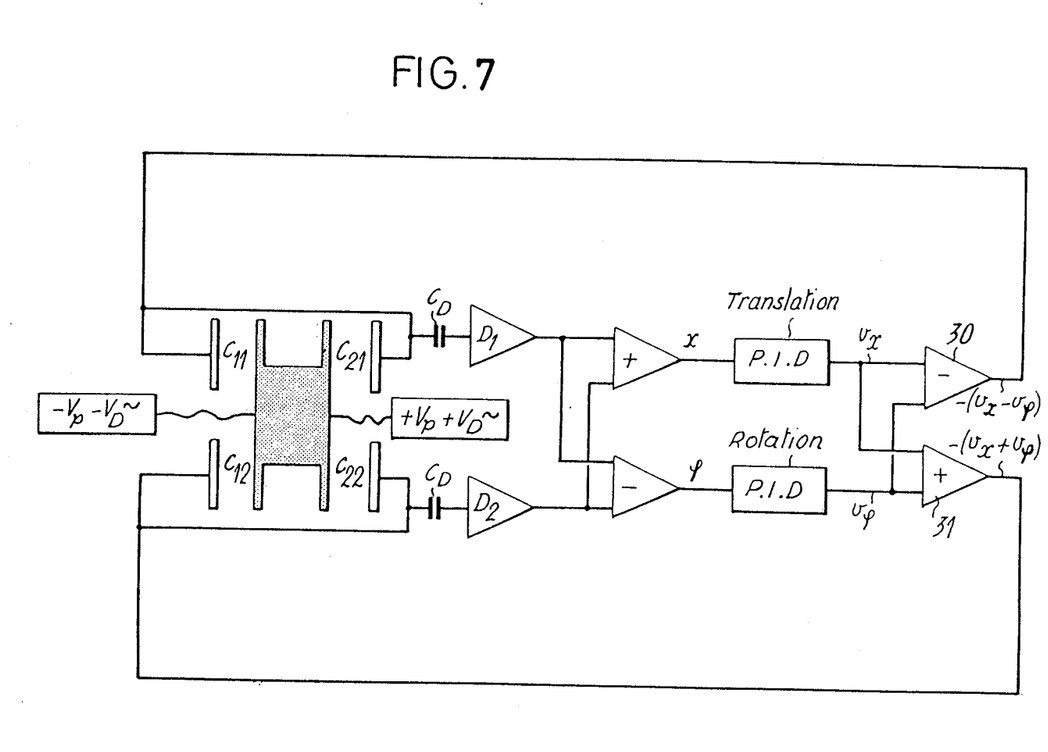
FIG. 7 is a block diagram of a servocontrol loop corresponding to FIGS. 5 and 6.

In FIG. 7 are illustrated the servocontrols according to the invention; they are based on the same principle as those of FIG. 3, except that the controls in FIG. 7 are simpler since each pair of opposite electrodes is supplied from a single control amplifier 30 or 31. For example, the output of amplifier 30 is connected to both electrodes 11 and 21.

Figure 8:
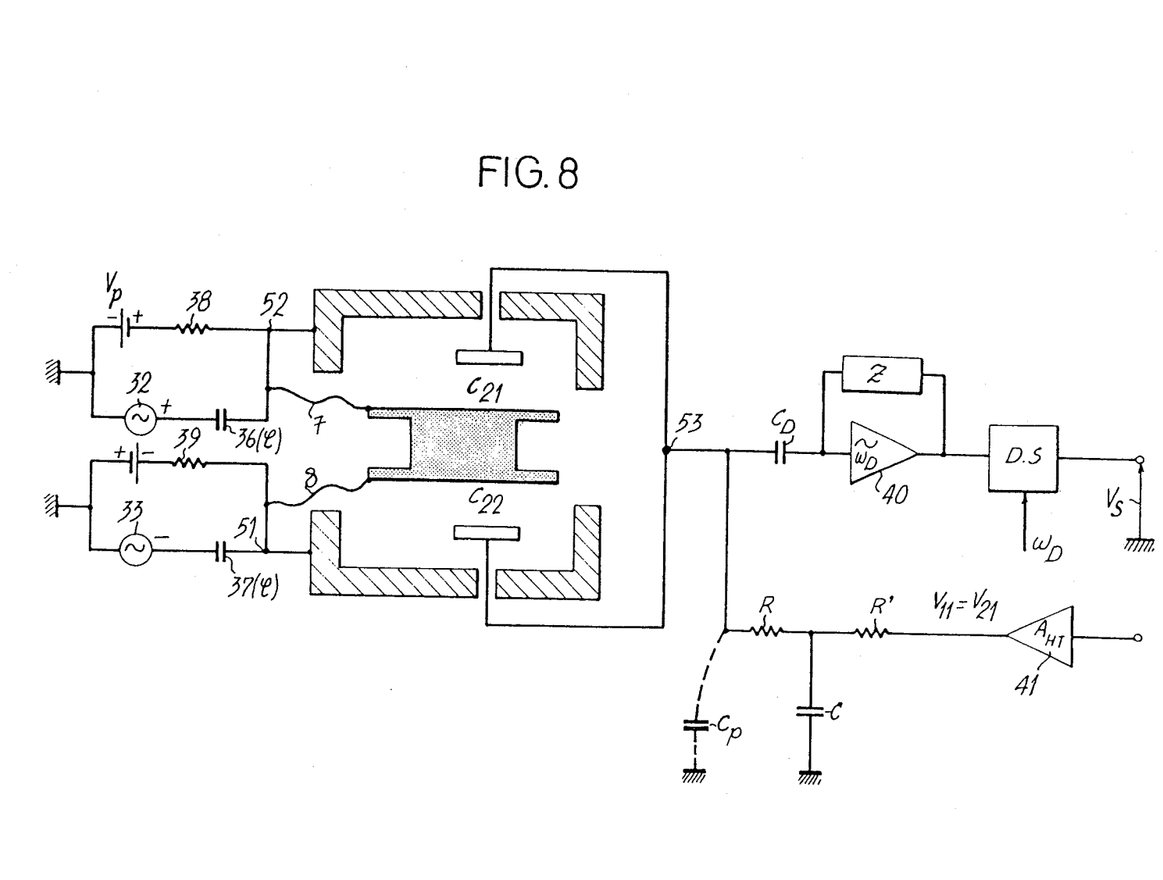
FIG. 8 is a diagram illustrating the operating principle of a differential transformerless capacitive detector designed for the accelerometer illustrated in FIGS. 5, 6 and 7.

In FIG. 8 is shown the operating principle of the invention as a capacitive detector and for applying DC control voltages to electrodes used for position sensing.

The oppositely phased detection signals $+V_D$ derived very low internal impedance generators 32, 33 are applied to opposite faces of the weight via flexible leads 7 and 8 and capacitors 36, 37 having very high values $\xi$. RC networks 36-38 and 37-39 for coupling the DC bias voltages $+V_p$ and $-V_p$ and the AC voltages of sources 32 and 33 as well as the DC detection voltages provide further filtering of the bias voltage.

Figure 9:
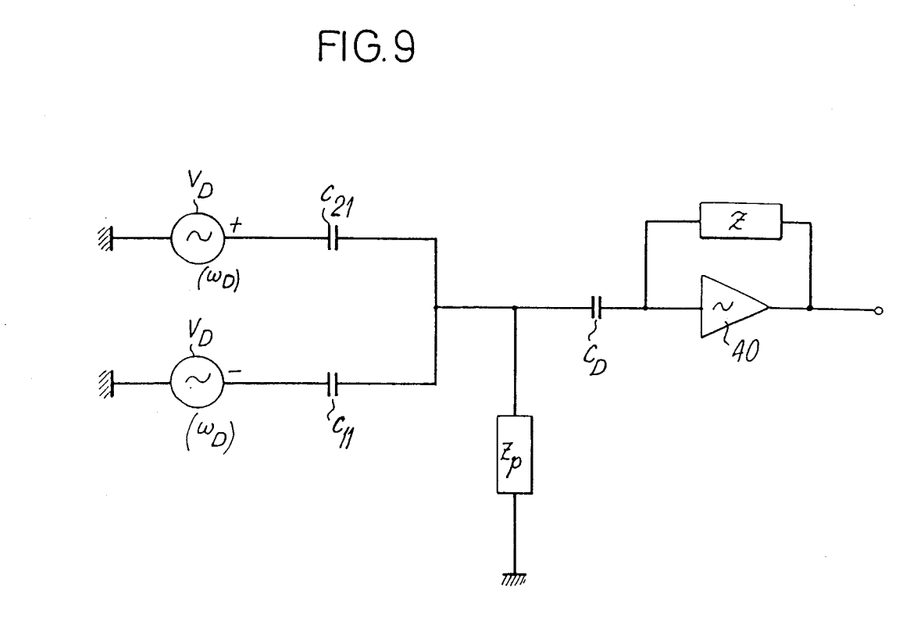
FIG. 9 is a schematic diagram equivalent to FIG. 8 for signals at the frequency of the detection signals.

In FIG. 9 is illustrated the equivalent circuit for the operation of the circuit diagrammed in FIG. 8 when the detection signals are at angular frequency $\omega_d$.

The unbalance signal obtained at detection signal angular frequency $\omega_d$ when the two capacitors $C_{11}$ and $C_{21}$ are unequal is amplified selectively by amplifier 40 having a feedback impedance Z that is highest at angular frequency $\omega_D$.

The stray or parasitic capacitance $C_p$ of the link between the electrodes and the detector input capacitor $C_D$, taken together with resistors R, R', capacitor C and the output impedance of control amplifier 41, constitutes an impedance $Z_p$ (FIG. 9) which does not disturb the detector balance and in practice has little effect on sensitivity.

The DC control signal voltage ($V_{11}$-$V_{21}$) is applied to the electrodes by a circuit including resistors R, RA', capacitances C, $C_p$, $C_D$, $C_{11}$ and $C_{21}$, and amplifier 40 that is sufficiently selective to ensure that changes in $V_{11}$ (or $V_{21}$) do not affect the measurement voltage $V_s$ delivered by the detector.

The invention as just described, especially in its principle of operation illustrated by FIGS. 8 and 9, applies to the realization of a single-axis accelerometer which can be one of the elements of a two- or three-axis system.

Figure 10:
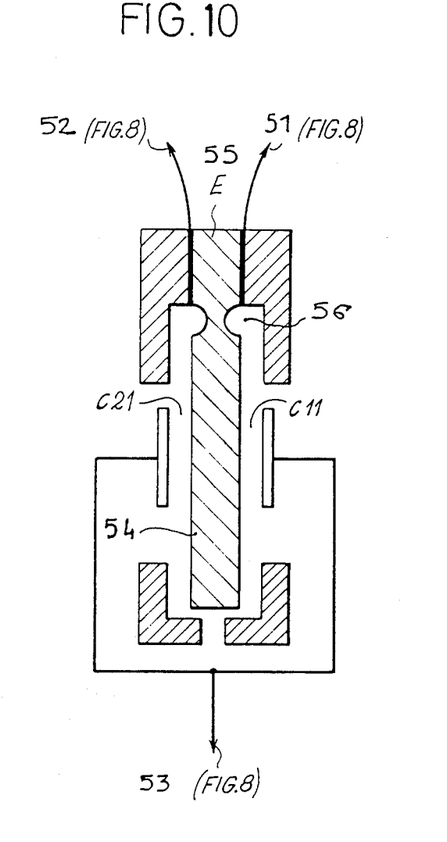
FIG. 10 is a schematic diagram of an alternative, hanging or "pendular" test weight usable in the accelerometer according to the invention, in lieu of the weight shown in FIG. 5.

In an alternative embodiment illustrated in FIG. 10, the cross-shaped test weight is replaced by a pendular insulating test weight 54 articulated about a hinge (including for example a necked portion 56) fixed on end 55 that is integral with the accelerometer frame. The test weight includes metallized, opposite planar faces connected to the $\pm V_D$ signal generators 51 and 52 in FIG. 8; electrodes $C_{11}$-$C_{21}$ of the test weight are connected to the capacitive detector 53 of the same figure.

It is possible to use a metallic test weight in the inventive accelerometer, in which case the weight is connected to the capacitive detector of FIG. 8 and the electrodes are respectively connected to the $\pm V_D$ signal generators 51 and 52 in FIG. 8. The test weight of such an embodiment is thereby easier to manufacture, since no metallization step is required.

What is claimed is:

1. Apparatus for sensing acceleration along an axis comprising:
   a test weight suspended by electrostatic forces, the test weight having mutually insulated first and second planar electrodes extending at a right angle to the axis on opposite sides of a first center line of the test weight, the first center line being at a right angle to the axis;

means for applying equal amplitude but opposite polarity a.c. and d.c. voltages to the first and second electrodes on the test weight;

first and second sets of fixedly mounted planar electrodes extending at right angles to the axis, the sets of electrodes being spaced from the test weight, the electrodes of the first and second sets being divided into first and second elements positioned on opposite sides of a second center line of the test weight, the second center line being at a right angle to the first center line, whereby the elements of the first and second electrode sets form third, fourth, fifth and sixth electrodes and first, second, third and fourth capacitors are respectively established between the first and third electrodes, the second and fourth electrodes, the first and fifth electrodes and the second and sixth electrodes, the third and fourth electrodes being connected together, the fifth and sixth electrodes being connected together; and means responsive to voltages developed at the third, fourth, fifth and sixth electrodes for developing first and second restoring electrostatic forces and for applying the restoring electrostatic forces to the third, fourth, fifth and sixth electrodes, the amplitude of at least one of the restoring forces being a measure of the acceleration experienced by the test weight relative to the fixedly mounted electrodes; the means for developing and applying restoring forces comprising: means for deriving first and second signals respectively responsive to the a.c. voltages at the third and fourth electrodes and at the fifth and sixth electrodes, means combining the first and second signals for deriving first and second restoring voltages, and means for respectively supplying the first and second restoring voltages to the third and fourth electrodes and to the fifth and sixth electrodes; the combining means deriving the sum and difference of the values of the first and second signals to derive third and fourth signals respectively indicative of translational acceleration of the test body along the axis and of rotary acceleration of the test body about a reference point of the test body.

2. The apparatus of claim 1 wherein the combining means derives fifth and sixth signals respectively indicative of the sum and difference of the third and fourth signals, and means for deriving first and second d.c. voltages having magnitudes and polarities determined by the values of the fifth and sixth signals, the first and second d.c. voltages being respectively applied to the third and fourth electrodes and to the fifth and sixth electrodes.

3. Apparatus for sensing acceleration along plural axes comprising:

a test weight suspended by electrostatic forces, the test weight having, for each of the axes, mutually insulated first and second planar electrodes extending at a right angle to the respective axis on opposite sides of a first center line of the test weight, the first center line being at a right angle to the respective axis;

means for applying equal amplitude but opposite polarity a.c. and d.c. voltages to the first and second electrodes for each of the axes on the test weight;

first and second sets of fixedly mounted planar electrodes for each axis extending at right angles to the respective axis, the sets of electrodes being spaced from the test weight, the electrodes of the first and second sets for each axis being divided into first and second elements positioned on opposite sides of a second center line for each axis of the test weight, the second center line being at a right angle to the first center line, whereby for each axis the elements of the first and second electrode sets form third, fourth, fifth and sixth electrodes and first, second, third and fourth capacitors are respectively established between the first and third electrodes, the second and fourth electrodes, the first and fifth electrodes and the second and sixth electrodes, the third and fourth electrodes for each axis being connected together, fifth and sixth electrodes for each axis being connected together; and for each axis, means responsive to voltages developed at the third, fourth, fifth and sixth electrodes for developing first and second restoring electrostatic forces and for applying the restoring electrostatic forces to the third, fourth, fifth and sixth electrodes, the amplitude of at least one of the restoring forces for each axis being a measure of the acceleration for each axis experienced by the test weight relative to the fixedly mounted electrodes; the means for developing and applying restoring forces for each axis comprising: means for deriving first and second signals respectively responsive to the a.c. voltages at the third and fourth electrodes and at the fifth and sixth electrodes, means combining the first and second signals for deriving first and second restoring voltages for each axis, and means for each axis for respectively supplying the first and second restoring voltages to the third and fourth electrodes and to the fifth and sixth electrodes; the combining means for each axis deriving the sum and difference of the values of the first and second signals to derive third and fourth signals respectively indicative of translational acceleration of the test body along the respective axis and rotary acceleration of the test body about a reference point of the test body about the respective axis.

4. The apparatus of claim 3 wherein the combining means derives for each axis fifth and sixth signals respectively indicative of the sum and difference of the third and fourth signals, and means for each axis for deriving first and second d.c. voltages having magnitudes and polarities determined by the values of the fifth and sixth signals, the first and second d.c. voltages being respectively applied to the third and fourth electrodes and to the fifth and sixth electrodes.

* * * * *